(12) United States Patent
Huang et al.

(10) Patent No.: US 11,471,757 B2
(45) Date of Patent: Oct. 18, 2022

(54) ELECTRONIC DEVICE AND METHOD OF AUTOMATICALLY TRIGGERING HOT KEY USING DISPLAY IMAGE

(71) Applicant: GIGA-BYTE TECHNOLOGY CO.,LTD., New Taipei (TW)

(72) Inventors: Hao-Kai Huang, New Taipei (TW); Cheng-Lung Lin, New Taipei (TW); Shih-Pin Chang, New Taipei (TW); Chih-Cheng Huang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 112 days.

(21) Appl. No.: 17/036,242

(22) Filed: Sep. 29, 2020

(65) Prior Publication Data

US 2021/0197084 A1 Jul. 1, 2021

(30) Foreign Application Priority Data

Dec. 31, 2019 (TW) .................................. 108148482

(51) Int. Cl.
*G06V 10/75* (2022.01)
*A63F 13/25* (2014.01)
(Continued)

(52) U.S. Cl.
CPC .............. *A63F 13/25* (2014.09); *A63F 13/53* (2014.09); *G06F 3/023* (2013.01); *G06V 10/751* (2022.01);
(Continued)

(58) Field of Classification Search
CPC ... G09G 5/006; G10L 25/72; H04N 21/42203
See application file for complete search history.

(56) References Cited

U.S. PATENT DOCUMENTS 6,287,198 B1 * 9/2001 McCauley ............ A63F 13/213
463/36
8,964,122 B2 2/2015 Lee et al.
(Continued)

FOREIGN PATENT DOCUMENTS

CN 106991424 B 8/2019
CN 110599479 A 12/2019
(Continued)

OTHER PUBLICATIONS

Shpigor, Ilya. Practical Video Game Bots . Apress, Berkeley, CA. pp. 142, 276-285 https://doi.org/10.1007/978-1-4842-3736-6_3 (Year: 2018).*

(Continued)

*Primary Examiner* — Ian L Lemieux
(74) *Attorney, Agent, or Firm* — Birch, Stewart, Kolasch & Birch, LLP

(57) ABSTRACT

An electronic device is provided. The electronic device includes: a display panel, a display controller, and a host. The display controller is configured to control displaying of the display panel. The host is electrically connected to the display controller. The host executes an application to render a display image, and transmits the display image to the display controller through an image-transmission channel between the host and the display controller. The display controller detects whether pixels in a specific area of the display image satisfy a predetermined condition. In response to the pixels in the specific area satisfying the predetermined condition, the display controller triggers a virtual input signal, and transmits the virtual input signal to the host through a data-transmission channel between the host and the display controller, so that the host executes a specific operation corresponding to the virtual input signal.

18 Claims, 6 Drawing Sheets

(51) Int. Cl.
*A63F 13/53* (2014.01)
*G06F 3/023* (2006.01)
*G06F 3/0482* (2013.01)

(52) U.S. Cl.
CPC .... *A63F 2300/6054* (2013.01); *G06F 3/0482* (2013.01)

(56) References Cited

U.S. PATENT DOCUMENTS

| | | | |
|---|---|---|---|
| 2004/0212610 A1 | 10/2004 | Hamlin | |
| 2013/0162502 A1* | 6/2013 | Lee | H04N 21/4363 345/1.2 |
| 2015/0278624 A1* | 10/2015 | Hou | G06F 3/0321 345/179 |
| 2016/0065726 A1* | 3/2016 | Kuznetsov | G06F 3/04842 455/414.1 |
| 2016/0179556 A1* | 6/2016 | McGowan | G06F 21/73 710/104 |
| 2017/0222986 A1 | 8/2017 | Trachtenberg et al. | |
| 2018/0091758 A1 | 3/2018 | Lee | |
| 2019/0096316 A1* | 3/2019 | Kang | G09G 3/3611 |
| 2021/0191389 A1* | 6/2021 | Myles | G06F 3/0489 |

FOREIGN PATENT DOCUMENTS

| | | |
|---|---|---|
| JP | 2009-140268 A | 6/2009 |
| JP | 2012-118716 A | 6/2012 |
| KR | 10-2001-0071454 A | 7/2001 |
| KR | 10-0458209 B1 | 11/2004 |
| KR | 10-2009-0046275 A | 5/2009 |
| KR | 10-2016-0130628 A | 11/2016 |
| TW | 201334530 A1 | 8/2013 |
| TW | 201626162 A | 7/2016 |
| TW | 201643648 A | 12/2016 |
| TW | 201725495 A | 7/2017 |
| TW | 201732385 A | 9/2017 |
| TW | 201809826 A | 3/2018 |

OTHER PUBLICATIONS

Brunner et al., "GPU Gems 3: Chapter 26. Object Detection by Color: Using the GPU for Real-Time Video Image Processing," GPU Gems 3 [online], Dec. 27, 2019, 8 pages total, URL: https://web.archive.org/web/20191227230441/https://developer.nvidia.com/gpugems/gpugems3/part-iv-image-effects/chapter-26-object-detection-color-using-gpu-real-time-video.
Extended European Search Report for European Application No. 20203361.3, dated May 20, 2021.
Taiwanese Office Action and Search Report for Taiwanese Application No. 108148482, dated Sep. 25, 2020.
Japanese Office Action for Japanese Application No. 2020-206164, dated Jan. 4, 2022, with English translation.
Korean Office Action for Korean Application No. 10-2020-0182289, dated Feb. 15, 2022, with English translation.

* cited by examiner

ELECTRONIC DEVICE AND METHOD OF AUTOMATICALLY TRIGGERING HOT KEY USING DISPLAY IMAGE

CROSS REFERENCE TO RELATED APPLICATIONS

This Application claims priority of Taiwan Patent Application No. 108148482, filed on Dec. 31, 2019, the entirety of which is incorporated by reference herein.

BACKGROUND OF THE INVENTION

Field of the Invention

The invention relates to display apparatuses, and, in particular, to an electronic device and a method of automatically trigger a hot key using a display image.

Description of the Related Art

Currently, commercially available display apparatuses such as televisions and computer monitors have more and more functions, and many of these functions are designed specifically for gamers, such as high frame rates, low response times, and so on. When a game player is playing a videogame, the game character often needs to press the corresponding hot key of a health-supplying function through the user's manual operation to perform health supplying. However, when the game situation is urgent, the user often cannot manually press the corresponding hot key to manually replenish blood. In addition, it is easy to make a mistake and press the wrong hot key.

BRIEF SUMMARY OF THE INVENTION

In view of the above, an electronic device and a method of automatically triggering a hot key using a display image are provided to solve the aforementioned problems.

In an exemplary embodiment, an electronic device is provided. The electronic device includes: a display panel, a display controller, and a host. The display controller is configured to control displaying of the display panel. The host is electrically connected to the display controller. The host executes an application to render a display image, and transmits the display image to the display controller through an image-transmission channel between the host and the display controller. The display controller detects whether pixels in a specific area of the display image satisfy a predetermined condition. In response to the pixels in the specific area satisfying the predetermined condition, the display controller triggers a virtual input signal, and transmits the virtual input signal to the host through a data-transmission channel between the host and the display controller, so that the host executes a specific operation corresponding to the virtual input signal. In the embodiment, the image-transmission channel is different from the data-transmission channel.

In some embodiments, the predetermined condition comprises a specific change or a specific ratio in a color of the pixels in the specific area, or the pixels in the specific area having a specific pattern or specific text. In some embodiments, the virtual input signal is a keyboard scan code supporting the Universal Serial Bus (USB) protocol.

In some embodiments, the host executes a detection program to detect whether the host is executing the application. When the detection program detects that the host is executing the application, the host transmits an execution status of the application to the display controller through the data-transmission channel, so that the display controller reads firmware corresponding to the application from a storage unit of the electronic device for execution, thereby setting the specific area and the predetermined condition.

In some embodiments, the specific area and the predetermined condition are set using a user interface of a detection program executed by the host, and the detection program detects whether the host is executing the application. When the detection program detects that the host is executing the application, the host transmits the execution status of the application to the display controller through the data-transmission channel.

In some embodiments, the specific area and the predetermined condition are set by an on-screen-display (OSD) menu of the display apparatus.

In some embodiments, the electronic device further comprises a hub and a keyboard controller. The keyboard controller is connected to the display controller through the hub, and is configured to provide a vendor identifier and a product identifier for recognition by the host.

In some embodiments, when the display controller determines that the pixels in the specific area satisfy the predetermined condition, the display controller transmits a hotkey control signal to the keyboard controller, and the keyboard controller converts the hotkey control signal to the corresponding virtual input signal via an encoding procedure, and transmits the virtual input signal to the host through the data-transmission channel.

In some embodiments, the display controller is further configured to track a game character and a life bar thereof in the display image, and analyze whether the pixels in the specific area corresponding to the life bar satisfy the predetermined condition.

In another exemplary embodiment, a method of automatically triggering a hot key using a display image for use in an electronic device is provided. The electronic device comprises a display panel, a display controller, and a host. The method includes the following steps: utilizing the host to execute an application to render a display image; utilizing the display controller to detect whether pixels in a specific area of the display image satisfy a predetermined condition; and in response to the pixels in the specific area satisfying the predetermined condition, utilizing the display controller to trigger a virtual input signal, and to transmit the virtual input signal to the host through a data-transmission channel between the host and the display controller, so that the host executes a specific operation corresponding to the virtual input signal.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
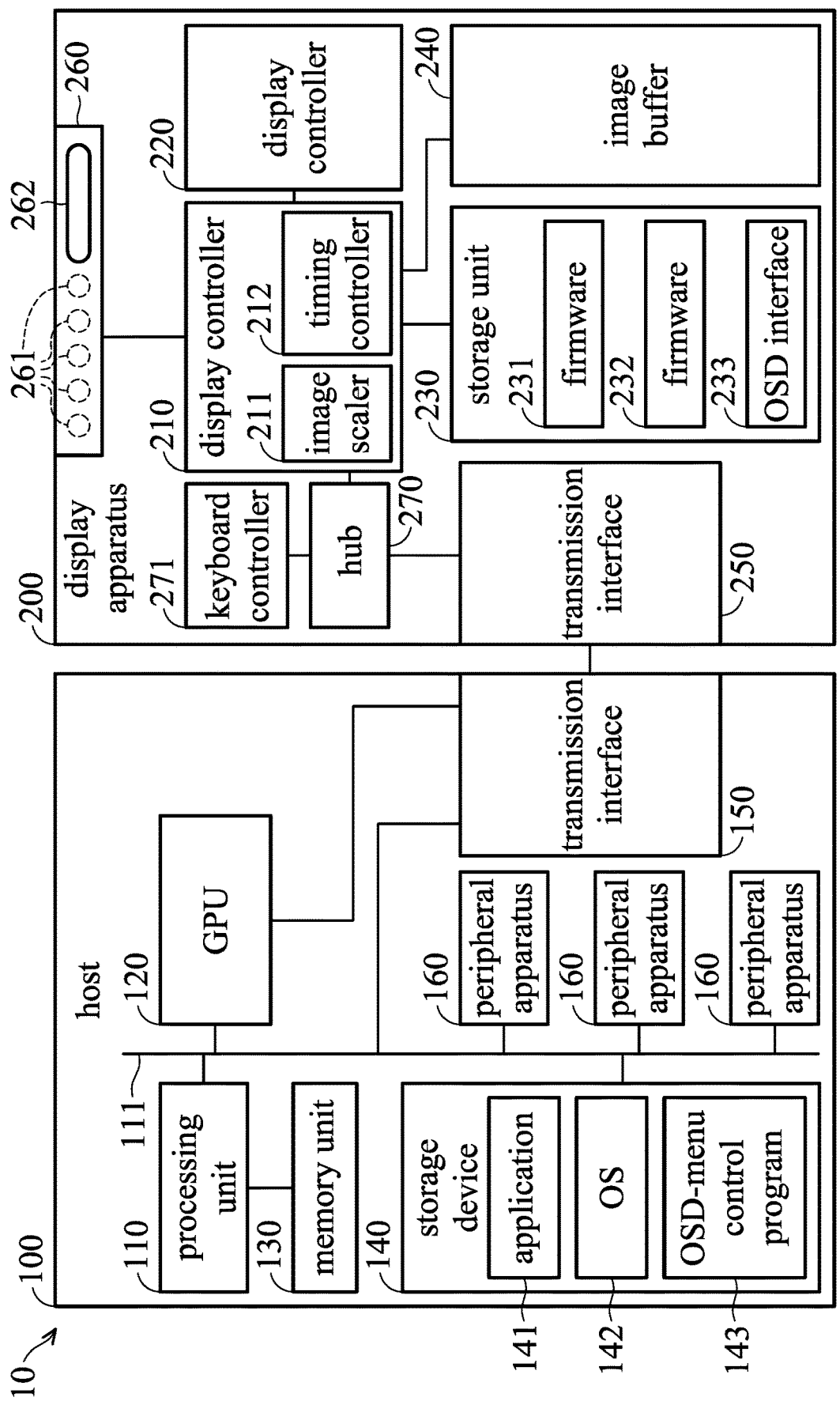
FIG. 1 is a block diagram of an electronic device in accordance with an embodiment of the invention.

FIG. 1 is a block diagram of an electronic device in accordance with an embodiment of the invention. The electronic device 10, for example, may be a personal computer or server equipped with a display apparatus. As illustrated in FIG. 1, the electronic device 10 includes a host 100 and a display apparatus 200, wherein the host 100 has a signal connection to the display apparatus 200. For example, the host 100 may include a processing unit 110, a graphics processing unit (GPU) 120, a memory unit 130, a storage device 140, one or more transmission interfaces 150, and one or more peripheral apparatuses 160. The processing unit 110, graphics processing unit 120, memory unit 130, storage device 140, transmission interfaces 150, and peripheral apparatuses 160 may be coupled to each other via the system bus 111. The processing unit 110, for example, may be a central processing unit (CPU), a general-purpose processor, etc., but the invention is not limited thereto. The graphics processing unit 120, for example, may be a graphics processing unit on a video adapter or integrated into the processing unit 110.

The memory unit 130 may be a random access memory such as a static random access memory (SRAM) or a dynamic random access memory (DRAM), but the invention is not limited thereto. The storage device 140 may be a non-volatile memory such as a hard-disk drive, a solid-state disk (SSD), a flash memory, or a read-only memory (ROM), but the invention is not limited thereto.

The transmission interface 150 may include wired transmission interfaces and/or wireless transmission interfaces. The wired transmission interfaces may include: high definition multimedia interface (HDMI), DisplayPort (DP) interface, embedded DisplayPort (eDP) interface, Universal Serial Bus (USB) interface, USB Type-C interface, Thunderbolt interface, digital video interface (DVI), video graphics array (VGA) interface, general purpose input/output (GPIO) interface, universal asynchronous receiver/transmitter (UART) interface, serial peripheral interface (SPI), inter-integrated circuit (I2C) interface, or a combination thereof. The wireless transmission interfaces may include Bluetooth, WiFi, near-field communication (NFC) interface, etc., but the invention is not limited thereto. The peripheral apparatus 160, for example, may include input apparatuses such as a keyboard, a mouse, a touch pad, etc., but the invention is not limited thereto.

For example, the storage device 140 may store one or more applications 141, an operating system 142 (e.g., Windows, Linux, MacOS, etc.), and an OSD-menu control program 143. The processing unit 110 may load the operating system 142, the OSD-menu control program 143, and one of the applications 141 to the memory unit 130 for execution. The OSD-menu control program 143 is configured to allow the user to control the OSD menu of the display apparatus 200 using the peripheral apparatus 160 of the host 100, where the details will be described later. The graphics processing unit 120, for example, may perform graphics processing of the application executed by the processing unit 110 to generate an image signal including one or more images, and transmit the image signal to the display apparatus 200 via one of the transmission interfaces 150 (e.g., HDMI or DisplayPort interface).

The display apparatus 200, for example, may be a flat panel display, a television, a projector, or a computer monitor, but the invention is not limited thereto. The display apparatus 200 includes a display controller 210, a display panel 220, a storage unit 230, an image buffer 240, one or more transmission interface 250, an input interface 260, and a hub 270. The transmission interface 250 may include wired transmission interfaces and/or wireless transmission interfaces. The wired transmission interfaces may include: high definition multimedia interface (HDMI), DisplayPort (DP) interface, embedded DisplayPort (eDP) interface, low-voltage differential signaling (LVDS) interface, Universal Serial Bus (USB) interface, USB Type-C interface, Thunderbolt interface, digital video interface (DVI), video graphics array (VGA) interface, general purpose input/output (GPIO) interface, universal asynchronous receiver/transmitter (UART) interface, serial peripheral interface (SPI), inter-integrated circuit (I2C) interface, or a combination thereof. The wireless transmission interfaces may include Bluetooth, WiFi, near-field communication (NFC) interface, etc., but the invention is not limited thereto.

The display controller 210, for example, may be implemented by an application-specific integrated circuit (ASIC), a system-on-chip (SoC), a processor, or a microcontroller, but the invention is not limited thereto.

The display module 220, for example, may be a liquid-crystal display panel, a light-emitting diode (LED) display panel, an organic light-emitting diode (OLED) display panel, a cathode ray tube (CRT) display, an E-Ink display module, an electroluminescent display module, a plasma display module, a projection display module, or a quantum dot display module, but the invention is not limited thereto.

The storage unit 230, for example, may be a non-volatile memory such as a read-only memory (ROM), an erasable programmable read-only memory (EPROM), an electrically erasable programmable read-only memory (EEPROM), etc., but the invention is not limited thereto. The storage unit 230 is configured to store firmware 231 associated with the display apparatus 200. The storage unit 230 may be disposed outside the display controller 210, or alternatively integrated into the display controller 210.

The firmware 231, for example, may include extended display identification data (EDID) and display settings of the display apparatus 200, and one or more on-screen-display (OSD) interfaces 233. The EDID, for example, may include information such as the manufacturer, product name, resolution, frames per second (FPS) of the display apparatus 200. The display settings of the display apparatus 200 may include the brightness, contrast, sharpness, color temperature of the display apparatus 200. The firmware 232 is used to control the OSD interfaces 233 of the display apparatus 200.

In an embodiment, the display controller 210 may read the firmware 231 and 232 and program code of the OSD interface 233 stored in the storage unit 230 via a bus (e.g., an I2C bus), and configure the corresponding display parameters. In addition, the display controller 210 may transmit the EDID of the display apparatus 200 to the host 100 via one of the transmission interfaces 250 (e.g., may be an image-transmission channel or a data-transmission channel), so that the processing unit 110 and the graphics processing unit 120 in the host 100 may configure the resolution and corresponding synchronization signals of the output image signal based on the EDID. The OSD interfaces 233, for example, may include an OSD menu and corresponding options, an information dashboard, a timer, a counter, a crosshair, a specific symbol, a specific color, a specific text, or a combination thereof, but the invention is not limited thereto.

The image buffer 240, for example, may be a volatile memory (e.g., a DRAM) or a non-volatile memory (e.g., a flash memory), that is configured to store output images to be displayed on the display panel 220, wherein the host 100 or the display controller 210 may, according to an OSD control signal generated by the host 100, overwrite a specific region of the image signal stored in the image buffer 240 with the one or more OSD interfaces 233 to generate an output image.

The input interface 260 is configured to control the OSD menu of the display apparatus 200. The input interface 260 may be implemented by one or more physical buttons 261 or a five-way joystick 262 to implement instructions such as up, down, left, right, and confirm. The hub 270, for example, may be a USB hub, and one of the transmission interfaces 250 may be a USB interface. The host 100 may transmit data to the display controller via the USB interface of the transmission interfaces 150 and 250 through the hub 270, and the display controller 210 may also transmit data to the host 100 via the USB interface of the transmission interfaces 150 and 250 through the hub 270.

In some embodiments, the display apparatus 200 may include a keyboard controller 271, wherein the keyboard controller 271 can be implemented by an embedded microcontroller or a keyboard integrated circuit that is configured to provide a physical vendor identifier (ID) and product ID for recognition by the host 100. In some other embodiments, the user may connect a USB keyboard and/or a USB mouse to the hub 270 of the display apparatus 200, so the host 100 may detect that there is a physical keyboard (e.g., including the keyboard controller for providing the keyboard ID) and mouse connection for use.

When the display apparatus 200 is equipped with a keyboard controller 271, the keyboard controller 271 may generate a corresponding virtual input signal according to a hot key control signal from the display controller 210 via an encoding procedure. The keyboard controller 271 may transmit the generated virtual input signal to the host 100 through the hub 270. For example, the hub 270 is electrically connected to the host 100 through the USB interfaces in the transmission interfaces 150 and 250, so the virtual input signal can be a keyboard scan code corresponding to the USB protocol, but the invention is not limited thereto.

In an embodiment, when the user performs an operation in one direction of the five-way joystick 262 (or presses one of the physical buttons 261), the display controller 210 may read the firmware 232 and the program code or firmware of the OSD menu and corresponding options of the OSD interfaces 233 from the storage unit 230, and display the OSD menu and corresponding options on the display panel 220. In an embodiment, the user may perform operations on the input interface 260 to control the OSD menu of the display apparatus to adjust the brightness, contrast, sharpness, color temperature, or activate or deactivate other interfaces among the OSD interfaces 233. In another embodiment, the activating and deactivating of the OSD interfaces 233 and the content displayed on the OSD interface 233, for example, can be controlled by the peripheral device 160 of the host 100, where the details will be described later. For example, the firmware 231 can be regarded as the default firmware of the display apparatus 200, and the user may control the settings of the OSD interface 233 displayed on the display apparatus 200 via the five-way joystick 262 (or the physical buttons 261).

In an embodiment, the display controller 210 may include an image scalar 211 and a timing controller 212. The display controller 210 may receive the image signal from the host 100 and/or another signal from other hosts via one of the transmission interfaces 250, and the image scalar 211 may perform an image-scaling process and/or image-overlaying process on the received image signals to fit the resolution of the display panel 220, and store the images (e.g., output images) generated by the image-scaling process to the image buffer 240. The timing controller 212 may control the display panel 220 to read the output images from the image buffer 240 for displaying.

In another embodiment, the display controller 210 may include the timing controller 212, and the resolution of the image signal from the host 100 may fit that of the display panel 220. Thus, the display controller 210 may directly store the received image signal from the host 100 to the image buffer 240 without performing the image-scaling process. The timing controller 212 may read the output images stored in the image buffer 240, and control the display panel 220 to display the output images.

Figure 2A:
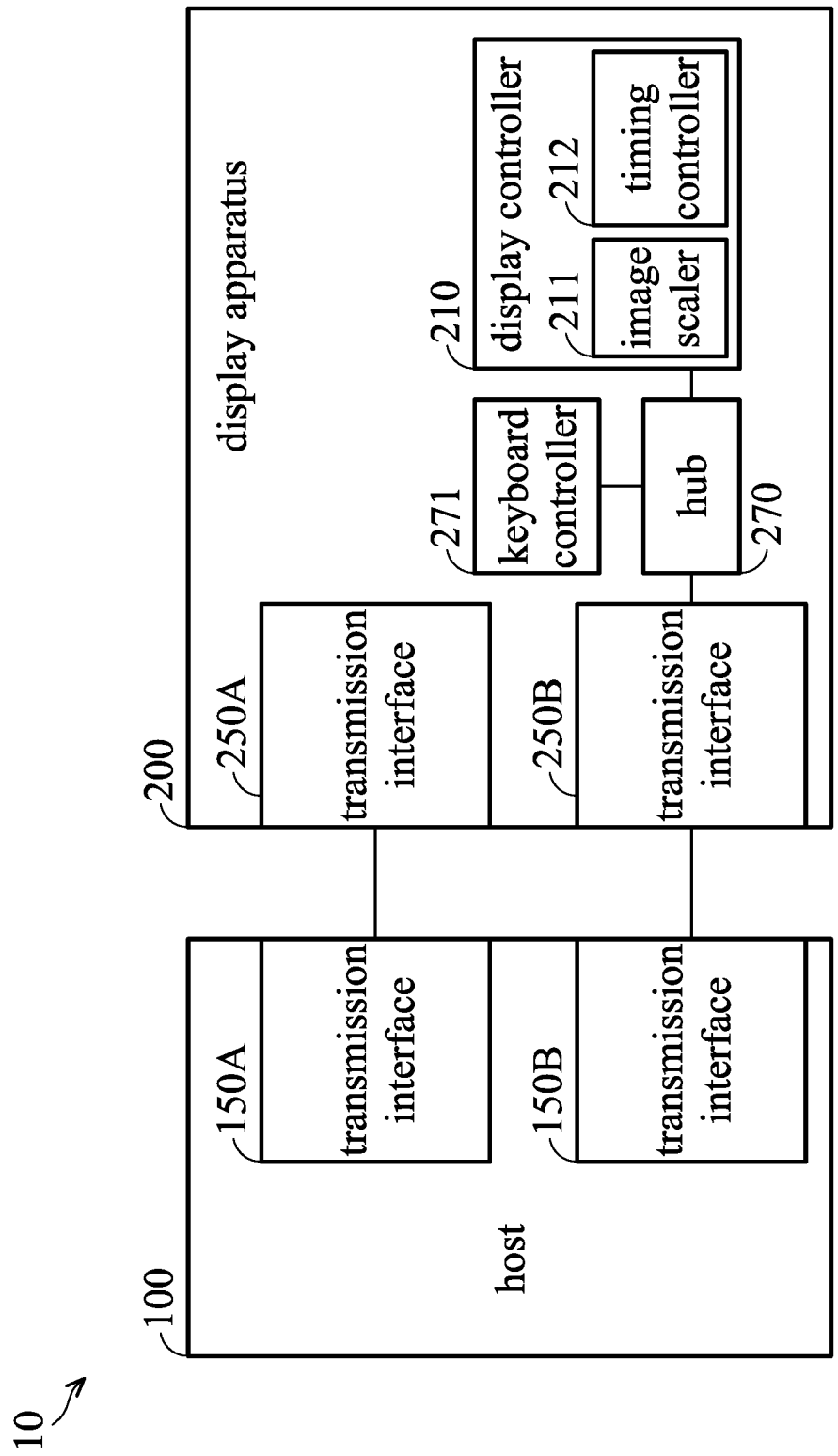
FIGS. 2A and 2B are diagrams of connection between the host and display apparatus in the electronic device in accordance with an embodiment of the invention.
Figure 2B:
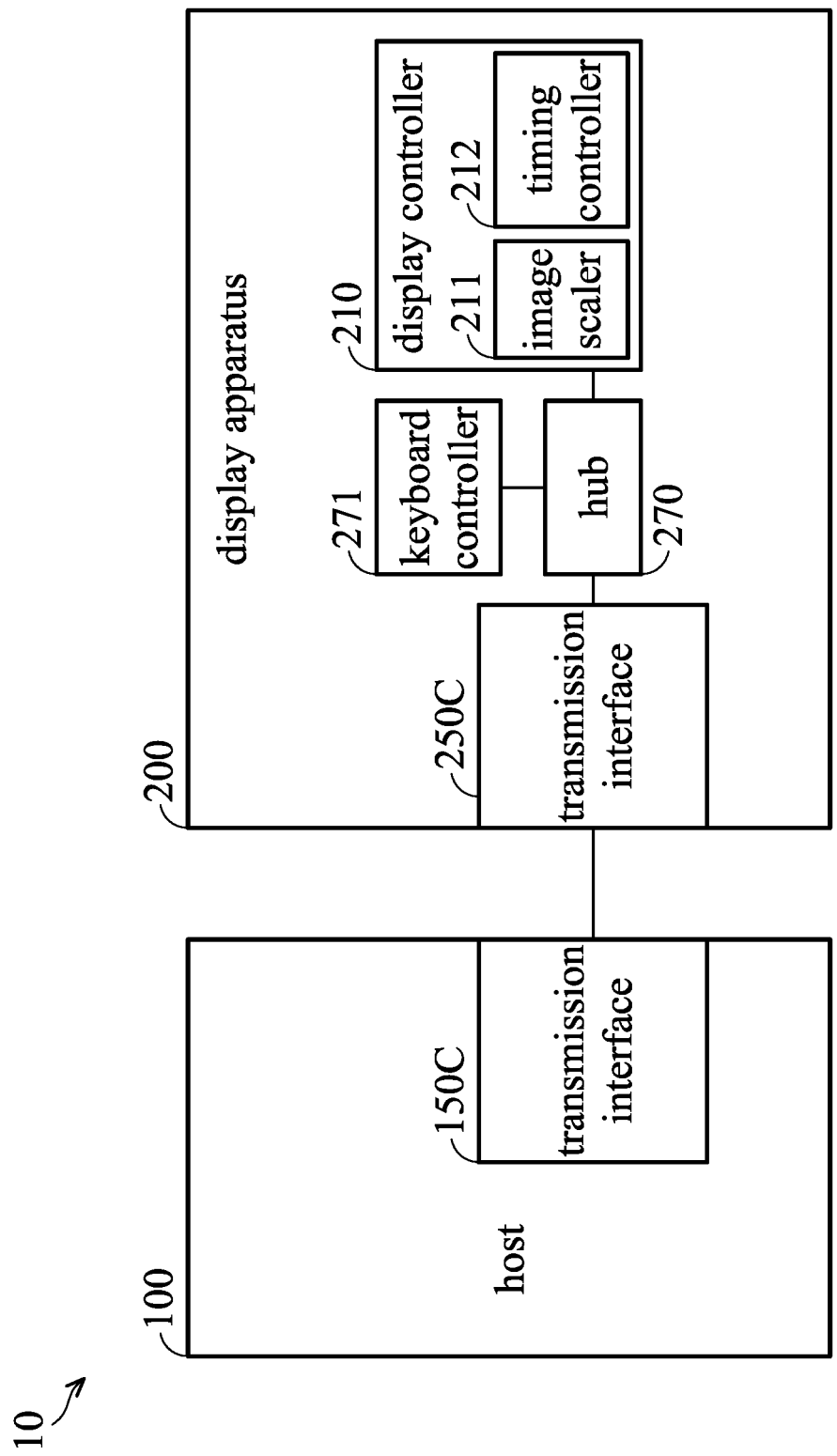

FIGS. 2A and 2B are diagrams of connection between the host and display apparatus in the electronic device in accordance with an embodiment of the invention.

In an embodiment, as depicted in FIG. 2A, the image signal generated by the graphics processing unit 120 of the host 100 may be transmitted to the display controller 210 of the display apparatus 200 via the transmission interface 150A (e.g., an HDMI interface) of the host 100 and the transmission interface 250A (e.g., an HDMI interface) of the display apparatus 200. For example, the transmission channel between the transmission interfaces 150A and 250A can be regarded as an image-transmission channel. The transmission channel between the transmission interfaces 150B and 250B can be regarded as a data-transmission channel or a control-signal-transmission channel. In some embodiments, if the electronic device 10 is a laptop computer, the transmission interfaces 150A and 250A can be eDP interfaces or LVDS interfaces, and the transmission interfaces 150B and 250B may be internal bus interfaces, I2C interfaces, or SPI interfaces, but the invention is not limited thereto.

In some other embodiments, as depicted in FIG. 2B, the image signal generated by the graphics processing unit 120 of the host 100 can be transmitted to the display controller 210 of the display apparatus 200 via the transmission interface 150C (e.g., a USB Type-C interface) of the host 100 and the corresponding transmission interface 250C (e.g., a USB Type-C interface) of the display apparatus 200.

It should be noted that the USB Type-C protocol may support Hi-Speed and SuperSpeed data transmission in addition to the image/video transmission (e.g., supporting the DisplayPort or HDMI standards). That is, the image-transmission channel and the data-transmission channel can be integrated into the USB Type-C interface. Accordingly, the host 100 may transmit the OSD control signal to the display apparatus 200 via the transmission interface 150C (e.g., a USB Type-C interface) of the host 100 and the corresponding transmission interface 250C (e.g., a USB Type-C interface) of the display apparatus 200.

In addition, in the embodiment of FIG. 2A or FIG. 2B, the display controller 210 of the display apparatus 200 can detect whether the pixels in a specific area or a selected area in the display image of the host 100 satisfy a predetermined condition. For example, if the host 100 is executing a computer game and the information displayed by the user interface of the computer game may include a life bar or mana bar of the game character, the host 100 will transmit the image signal of the display image of the computer game to the display controller through the transmission interfaces 150 and 250 (e.g., can be implemented by the connections shown in FIG. 2A or 2B). Accordingly, the display controller 210 may analyze whether pixels in a specific area or a selected area satisfy a predetermined condition, wherein the aforementioned predetermined condition, for example, may be a specific change or a specific ratio in pixel colors in the specific area or selected area, or the pixels in the specific area or selected area having a specific pattern or specific text.

Specifically, the specific area or selected area in the display image detected by the display controller 210 can be set in different ways. For example, in an embodiment, the firmware setting corresponding to the program (e.g., a specific computer game or utility program) executed by the host can be preset and stored in the storage unit 230 of the display apparatus 200. The host 100 may execute a detection program to detect whether the host 100 is currently executing a specific computer game or application. If it is detected that the host 100 is currently executing a specific computer game or application, the host 100 may transmit the execution status of the specific computer game or application to the display controller 210 through the data-transmission channel, and thus the display controller 210 can read the firmware corresponding to the specific computer game or application that is pre-stored in the storage unit for execution, thereby detecting whether pixels in a specific area of the display image of the specific computer game or application satisfy the predetermined condition.

In another embodiment, in addition to detecting whether the host 100 is executing a specific computer game or application, the detection program executed by the host 100 can also provide a user interface that allows the user to use a box frame to select the size and position of the area in the display image to be detected by the display apparatus 200, and to select the predetermined condition for triggering in the selected area. For example, the predetermined condition may be the life bar in the game screen changing from green to red, the life bar being less than a predetermined ratio, or setting the display apparatus 200 to track the game character and its life bar (e.g., may have different shapes or colors) or life texts, or poison symbols, etc., but the invention is not limited thereto. After the setting is completed, the host 100 may transmit the set selected area to the display controller 210 of the display apparatus 200 through the data-transmission channel, and the display controller 210 detects whether pixels in the selected area of the display image satisfy the predetermined condition.

In yet another embodiment, the user may call the OSD menu of the display apparatus 200 by operating the five-way joystick 262 or the physical buttons 261 of the display apparatus 200, and may select a corresponding detection-setting option from the OSD menu to select the area to be detected in the display image, and select the predetermined condition for triggering in the selected area. For example, the predetermined condition may be the life bar in the game screen changing from green to red, the life bar being less than a predetermined ratio, or setting the display apparatus 200 to track the game character and its life bar (e.g., may have different shapes or colors) or life texts, or poison symbols, etc., but the invention is not limited thereto. After the setting is completed, the host 100 may transmit the set selected area to the display controller 210 of the display apparatus 200 through the data-transmission channel, and the display controller 210 detects whether pixels in the selected area of the display image satisfy the predetermined condition.

If the display apparatus 200 does not include the keyboard controller 271, when the display controller 210 detects that the pixels in the specific area or selected area in the image signal satisfy the predetermined condition, the display controller 210 may generate a virtual input signal for triggering a specific key or key combinations, and transmit the virtual input signal to the host 100 through the transmission interfaces 150 and 250, wherein the virtual input signal, for example, may be keyboard scan codes compatible with the USB protocol. After the host 100 has received the virtual input signal, the host 100 will decode the virtual input signal to obtain the input signal that represents a specific key or key combination, and execute the specific key or key combinations represented by the input signal.

If the display apparatus includes the keyboard controller 271, the display controller 271 may send a hotkey control signal to the keyboard controller 271 (e.g., via the hub 270 or directly to the keyboard controller 271), and the keyboard controller 271 may convert the hotkey control signal into a corresponding virtual input signal through an encoding procedure, wherein the virtual input signal can be, for example, a keyboard scan code supporting the USB protocol. After receiving the virtual input signal, the host 100 will decode the virtual input signal to obtain the input signal that represents a specific key or key combinations, and execute the specific operation represented by the input signal (e.g., pressing the specific key or key combinations).

For example, in a computer game, the specific key or key combination represented by the input signal, for example, may be a specific hot key or a combination of hot keys set in a computer game, such as using blood-replenishing items, using an antidote, or using character skills or big tricks, etc., However, the present invention is not limited to being applied only to computer games, and can also be applied to other general applications.

Figure 3A:
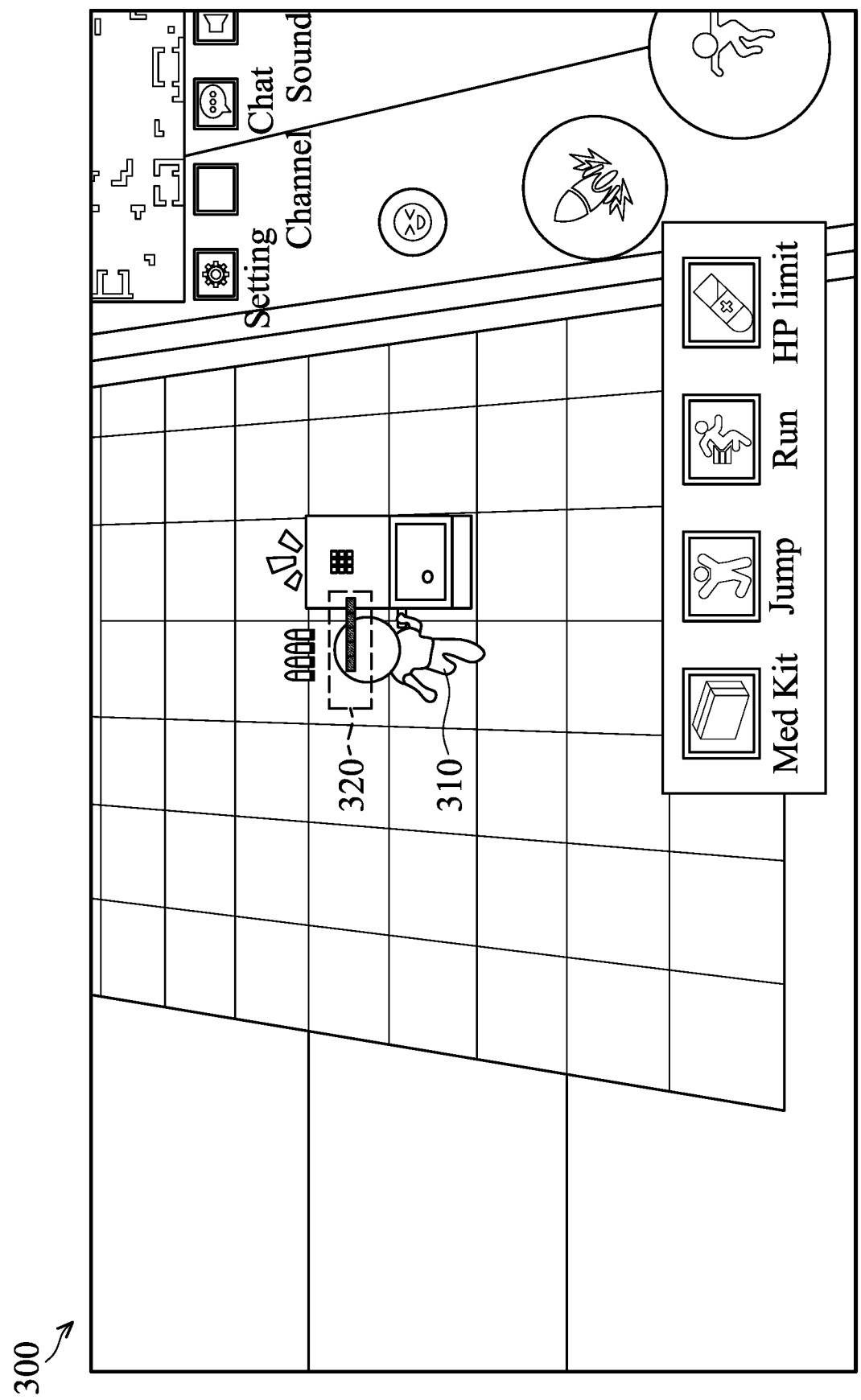
FIGS. 3A and 3B are diagrams of a game interface in accordance with an embodiment of the invention.
Figure 3B:
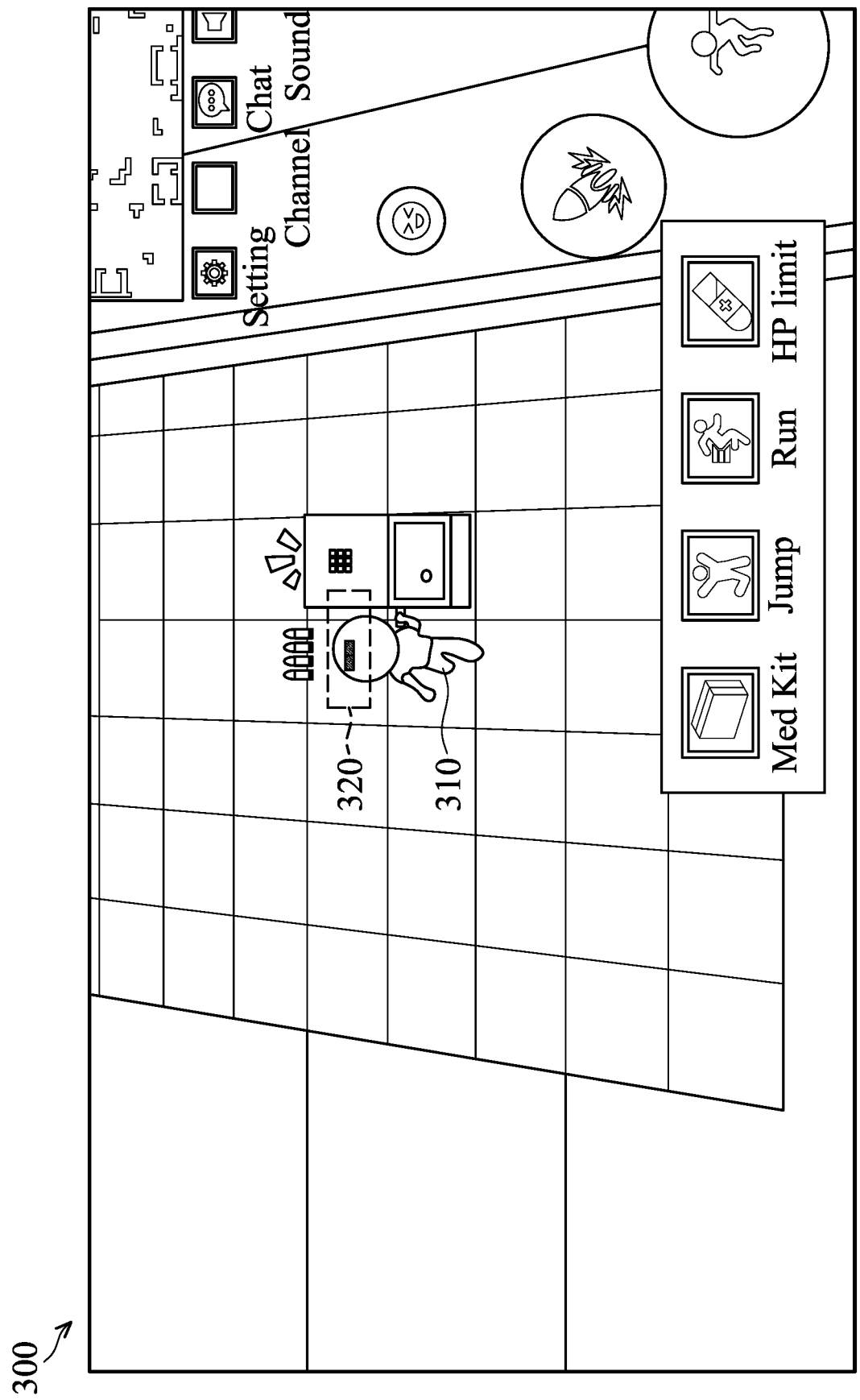

FIGS. 3A and 3B are diagrams of a game interface in accordance with an embodiment of the invention.

Specifically, if the display controller 210 is implemented by a microcontroller with weak computing power, the display controller 210 can also determine the change or specific ratio of colors of the pixels in the specific area or selected area. For example, the image signal transmitted from the host 100 to the display controller 210 may be an RGB signal that is channel-encoded through the transmission interface 150. When the transmission interface 250 of the display apparatus 200 performs channel-decoding on the received image signal, the RGB signal can be obtained, so the display controller 210 can determine the color of each pixel in the display image. For example, the values of the red, green, and blue subpixels in different predetermined ranges can be classified into different colors. Accordingly, the display controller 210 can obtain information about the color change or the portion of color distribution of the pixels in the selected range, and determine whether to trigger the virtual input signal.

In addition, if the display controller 210 is implemented by a processor with strong computing power, the display controller 210 can track the game character and its life bar. For example, some computer games have the game character that is not located at a fixed position in the display image, so it is necessary to detect the position of the game character in the display image and determine its corresponding character life bar. However, the character life bar is not necessarily presented in a long bar or a grid, but may also be presented in life text or numbers. In the embodiment, the display controller 210 can also recognize the character's life text or numbers in the display image to obtain the current life value of the game character, and determine whether the current life value of the game character is less than a predetermined value or a predetermined ratio. One having ordinary skill in the art will appreciate the technical content of recognizing characters or number in an image, and thus the details thereof will not be repeated here.

As depicted in FIG. 3A, the game character 310, for example, may be located in the middle of the user interface 300, and when the game character 310 is full of life, the life bar of the game character in block 320 will have a certain length or number of cells (e.g., 5 cells) and can be represented by the green color, but the invention is not limited thereto.

When the health level of the game character is damaged in the game, the length or number of cells of the character's life in block 320 will be reduced, and may appear yellow (e.g., the life is between 50% to 100%) or red (e.g., the life is below 50%). When the display controller 210 determines that the length or number of life cells in a specific area (i.e., block 320) in the display image of the computer game is lower than a predetermined ratio (e.g., less than 3 cells or less than 50%), as shown by 2 life cells in FIG. 3B. At this time, the display apparatus 200 may trigger the virtual input signal (e.g., representing a life-replenishing hot key H being pressed), and transmit the virtual input signal to the host 100. Additionally, in addition to the aforementioned determination methods, the display controller 210 may also determine that when the color of the life bar in the specific area (i.e., block 320) in the display image of the computer game becomes red, a virtual input signal is triggered.

Therefore, after receiving the virtual input signal, the host 100 can perform a specific operation corresponding to the virtual input signal (e.g., pressing the life-replenishing hot key H). It should be noted that the aforementioned embodiment may be applicable to the architecture of FIG. 2A or FIG. 2B as well the architecture of the display apparatus 200 with or without the keyboard controller 271.

Figure 4:
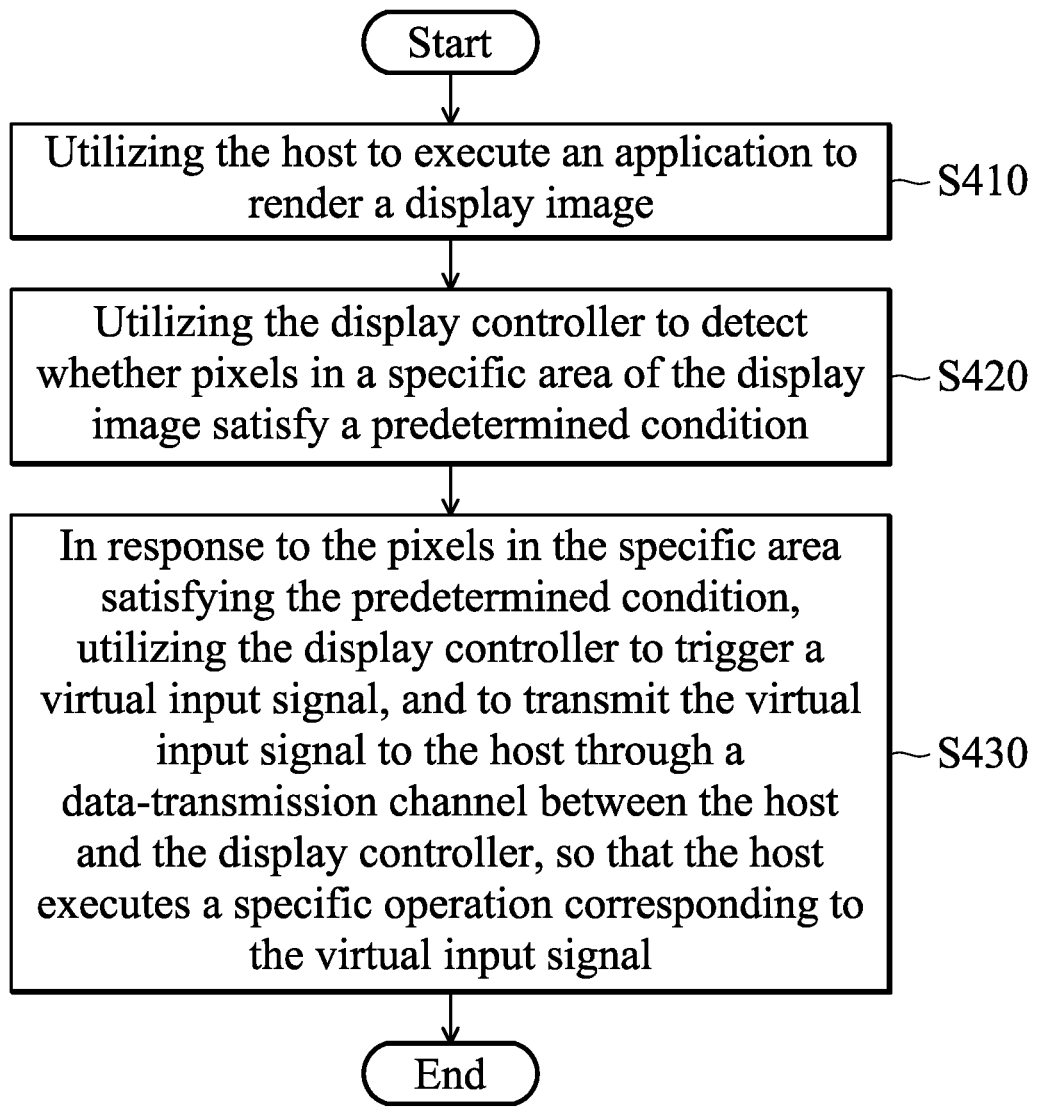
FIG. 4 is a flow chart of a method of automatically triggering a hot key using a display image in accordance with an embodiment of the invention.

FIG. 4 is a flow chart of a method of automatically triggering a hot key using a display image in accordance with an embodiment of the invention.

In step S410, the host 100 executes an application to render a display image, and transmits the display image to the display controller 210 via an image-transmission channel between the host 100 and the display controller 210. For example, the host 100 can transmit the image signal of the display image to the display apparatus 200 through the image-transmission channel, and when the display apparatus 200 determines to trigger a virtual input signal, the display apparatus 200 will transmit the virtual input to the host 100 through the data-transmission channel, wherein the connections of the data-transmission channel and the image-transmission channel can be referred to the embodiments of FIGS. 2A and 2B.

In step S420, the display controller 210 detects whether pixels in a specific area of the display image satisfy a predetermined condition. For example, the display controller 210 may store the image signal of the display image from the host 100 in the image buffer 240, and the display controller 210 can read the pixels in the specific area of the display image stored in the image buffer 240 for analysis, and determine whether the pixels in the specific area satisfy the predetermined condition. For example, the predetermined condition may be a specific change or a specific ratio in pixel colors in the specific area (or selected area), or the pixels in the specific area (or selected area) having a specific pattern or specific text. For example, the application executed by the host 100 may be a computer game, and the specific area may be the surrounding area of the life bar of the game character.

In the aforementioned embodiments, the specific area or selected area detected by the display controller 210 may be set in a variety of ways, for example: (1) the firmware of a specific computer game or application that is set in advance may be used, and the detection program executed by the host 100 can detect whether the host 100 is executing the specific computer game or application. If it is detected that the host 100 is executing the specific computer game or application, the host 100 can transmit the execution status of the specific computer game or application to the display controller 210 through the data-transmission channel, so the display controller 210 can read the firmware corresponding to the specific computer game or application pre-stored in the storage unit 230 for execution, thereby detecting whether pixels in the specific area of the display image of the specific computer game or application satisfy the predetermined condition; (2) the user interface of the detection program executed by the host 100 can allow the user to use a box frame to select the size and position of the area in the display image to be detected by the display controller 210, and to select the predetermined condition for triggering in the selected area; (3) the user may call the OSD menu of the display apparatus 200 by operating the five-way joystick 262 or the physical buttons 261 of the display apparatus 200, and may select a corresponding detection-setting option from the OSD menu to select the area to be detected in the display image, and select the predetermined condition for triggering in the selected area.

In step S430, in response to the pixels in the specific area satisfying the predetermined condition, the display controller 210 generates a virtual input signal, and transmits the virtual input signal to the host 100 through the data-transmission channel, so that the host 100 executes a specific operation corresponding to the virtual input signal. For example, the virtual input signal may be a keyboard scan code supporting the USB protocol. After receiving the virtual input signal, the host 100 may decode the virtual input signal to obtain an input signal of a specific key or key combination represented by the virtual input signal, and execute the specific key or key combination represented by the input signal. It should be noted that the aforementioned embodiment may be applicable to the architecture of FIG. 2A or FIG. 2B as well the architecture of the display apparatus 200 with or without the keyboard controller 271.

In view of the above, an electronic device and a method of automatically trigger a hot key using a display image are provided. The electronic device and the method are capable of detecting whether pixels in a specific area or selected satisfy a predetermined condition, and generating a virtual input signal in response to the display controller determining that the pixels satisfy the predetermined condition. The display controller may transmit the virtual input signal to the host through the data-transmission channel between the host and the display apparatus, so that the host can perform the specific operation corresponding to the virtual input signal (e.g., pressing a specific key or key combination). Accordingly, the function of automatically trigger the hot key through the analysis of the display image by the display apparatus can avoid the situation that the user can only manually replenish life or cannot replenish life of the game character when playing the game, thereby increasing the user experience.

The use of terms such as "first", "second", and "third" in claims is used to modify elements in the claims, and is not used to indicate that there is a priority order, antecedent relationship, or is an element preceded by another element, or a chronological order when performing a method step, only used to distinguish elements with the same name.

While the invention has been described by way of example and in terms of the preferred embodiments, it should be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An electronic device, comprising:
    a display apparatus including:
        a display panel;
        a display controller, configured to control displaying of the display panel; and
    a host, electrically connected to the display controller,
    wherein the host executes an application to render a display image, and transmits the display image to the display controller through an image-transmission channel between the host and the display controller,
    wherein the display controller detects whether pixels in a specific area of the display image satisfy a predetermined condition,
    wherein in response to the pixels in the specific area satisfying the predetermined condition, the display controller triggers a virtual input signal, and transmits the virtual input signal to the host through a data-transmission channel between the host and the display controller, so that the host executes a specific operation corresponding to the virtual input signal,
    wherein the specific area and the predetermined condition are set by an on-screen-display (OSD) menu of the display apparatus.

2. The electronic device as claimed in claim 1, wherein the image-transmission channel is different from the data-transmission channel.

3. The electronic device as claimed in claim 2, further comprising: a hub and a keyboard controller, and the keyboard controller is connected to the display controller through the hub, and is configured to provide a vendor identifier and a product identifier for recognition by the host.

4. The electronic device as claimed in claim 3, wherein when the display controller determines that the pixels in the specific area satisfy the predetermined condition, the display controller transmits a hotkey control signal to the keyboard controller, and the keyboard controller converts the hotkey control signal to the corresponding virtual input signal via an encoding procedure, and transmits the virtual input signal to the host through the data-transmission channel.

5. The electronic device as claimed in claim 1, wherein the predetermined condition comprises a specific change or a specific ratio in a color of the pixels in the specific area, or the pixels in the specific area having a specific pattern or specific text.

6. The electronic device as claimed in claim 1, wherein the virtual input signal is a keyboard scan code supporting the Universal Serial Bus (USB) protocol.

7. The electronic device as claimed in claim 1, wherein the host executes a detection program to detect whether the host is executing the application,
    wherein when the detection program detects that the host is executing the application, the host transmits an execution status of the application to the display controller through the data-transmission channel, so that the display controller reads firmware corresponding to the application from a storage unit of the electronic device for execution, thereby setting the specific area and the predetermined condition.

8. The electronic device as claimed in claim 1, wherein the specific area and the predetermined condition are set using a user interface of a detection program executed by the host, and the detection program detects whether the host is executing the application,
    wherein when the detection program detects that the host is executing the application, the host transmits an execution status of the application to the display controller through the data-transmission channel.

9. The electronic device as claimed in claim 1, wherein the display controller is further configured to track a game character and a life bar thereof in the display image, and analyze whether the pixels in the specific area corresponding to the life bar satisfy the predetermined condition.

10. A method of automatically triggering a hot key using a display image, for use in an electronic device, wherein the electronic device comprises a display apparatus and a host, wherein the display apparatus includes a display panel and a display controller, the method comprising:
    utilizing the host to execute an application to render a display image by transmitting the display image to the display controller through an image-transmission channel between the host and the display controller;
    utilizing the display controller to detect whether pixels in a specific area of the display image satisfy a predetermined condition; and
    in response to the pixels in the specific area satisfying the predetermined condition, utilizing the display controller to trigger a virtual input signal, and to transmit the virtual input signal to the host through a data-transmission channel between the host and the display controller, so that the host executes a specific operation corresponding to the virtual input signal,
    wherein the specific area and the predetermined condition are set by an on-screen-display (OSD) menu of the display apparatus.

11. The method as claimed in claim 10, wherein the image-transmission channel is different from the data-transmission channel.

12. The method as claimed in claim 11, wherein the electronic device further comprises a hub and a keyboard controller, and the keyboard controller is connected to the display controller through the hub, and is configured to provide a vendor identifier and a product identifier for recognition by the host.

13. The method as claimed in claim 12, further comprising:
    when the pixels in the specific area satisfy the predetermined condition, utilizing the display controller to transmit a hotkey control signal to the keyboard controller; and
    utilizing the keyboard controller to convert the hotkey control signal to the corresponding virtual input signal via an encoding procedure, and to transmit the virtual input signal to the host through the data-transmission channel.

14. The method as claimed in claim 10, wherein the predetermined condition comprises a specific change or a specific ratio in a color of the pixels in the specific area, or the pixels in the specific area having a specific pattern or specific text.

15. The method as claimed in claim 10, wherein the virtual input signal is a keyboard scan code supporting the Universal Serial Bus (USB) protocol.

16. The method as claimed in claim 10, further comprising:
- utilizing the host to execute a detection program to detect whether the host is executing the application;
- when the detection program detects that the host is executing the application, utilizing the host to transmit an execution status of the application to the display controller through the data-transmission channel, so that the display controller reads firmware corresponding to the application from a storage unit of the electronic device for execution, thereby setting the specific area and the predetermined condition.

17. The method as claimed in claim 10, wherein the specific area and the predetermined condition are set using a user interface of a detection program executed by the host, and the detection program detects whether the host is executing the application, and the method further comprises:
- when the detection program detects that the host is executing the application, utilizing the host to transmit an execution status of the application to the display controller through the data-transmission channel.

18. The method as claimed in claim 10, further comprising:
- utilizing the display controller to track a game character and a life bar thereof in the display image, and to analyze whether the pixels in the specific area corresponding to the life bar satisfy the predetermined condition.

* * * * *